(12) United States Patent
Sugita et al.

(10) Patent No.: US 8,142,842 B2
(45) Date of Patent: Mar. 27, 2012

(54) INK-JET RECORDING METHOD

(75) Inventors: Hajime Sugita, Tokyo (JP); Shigeki Shino, Tokyo (JP)

(73) Assignee: Mitsubishi Paper Mills Limited, Tokyo (JP)

( * ) Notice: Subject to any disclaimer, the term of this patent is extended or adjusted under 35 U.S.C. 154(b) by 783 days.

(21) Appl. No.: 11/976,284

(22) Filed: Oct. 23, 2007

(65) Prior Publication Data

US 2008/0095948 A1    Apr. 24, 2008

(30) Foreign Application Priority Data

Oct. 24, 2006    (JP) .................................. 2006-289144

(51) Int. Cl.
*B05D 1/04*    (2006.01)
(52) U.S. Cl. ..................................... 427/180; 427/427.7
(58) Field of Classification Search .................. 427/180, 427/427.7
See application file for complete search history.

(56) References Cited

U.S. PATENT DOCUMENTS

| | | | | |
|---|---|---|---|---|
| 6,039,796 | A * | 3/2000 | Kubota et al. | 106/31.6 |
| 6,685,999 | B2 * | 2/2004 | Ichinose et al. | 428/32.25 |
| 2003/0222959 | A1 | 12/2003 | Yamanouchi et al. | |
| 2004/0266907 | A1 * | 12/2004 | Sugita et al. | 523/160 |
| 2005/0106317 | A1 * | 5/2005 | Shino | 427/180 |
| 2006/0078694 | A1 * | 4/2006 | Motoda et al. | 428/32.24 |
| 2006/0204687 | A1 * | 9/2006 | Iwasaki et al. | 428/32.34 |

FOREIGN PATENT DOCUMENTS

| | | |
|---|---|---|
| EP | 0-826-508 A1 | 3/1998 |
| EP | 1-138-513 A1 | 10/2001 |
| EP | 1-418-055 A1 | 5/2004 |
| EP | 1-524-116 A1 | 4/2005 |
| EP | 1-580-016 A1 | 9/2005 |

OTHER PUBLICATIONS

Database WPI Week 200460; Derwent Publications Ltd., London, GB; AN 2004-618417; XP002461703.
Database WPI Week 200418; Derwent Publications Ltd., London GB; AN 2004-183706; XP002461704.
Database WPI Week 200438; Derwent Publications Ltd., London GB; AN 2004-403211; XP002461705.

* cited by examiner

*Primary Examiner* — Timothy Meeks
*Assistant Examiner* — Nathan T Leong
(74) *Attorney, Agent, or Firm* — Birch, Stewart, Kolasch & Birch, LLP

(57) ABSTRACT

The present invention relates to a ink-jet recording method for printing with a glycol ink which contains 60 parts by weight or more of glycol ether based on 100 parts by weight of the ink, comprising printing by ejecting the glycol ink on an ink-jet recording material, wherein the ink-jet recording material comprises a support, at least one porous ink-receptive layer which contains inorganic fine particles having an average secondary particle size of 500 nm or less and a resin binder provided on the support, and a front surface layer containing an acrylic resin emulsion provided on the ink-receptive layer.

10 Claims, No Drawings

INK-JET RECORDING METHOD

BACKGROUND OF THE INVENTION

1. Technical Field

The present invention relates to an ink-jet recording method which gives excellent coloring property, ink drying property, and scratch resistance when printing is carried out with an ink-jet printer using glycol ink.

2. Background Art

In recent years, according to rapid innovation of ink-jet recording techniques, extremely excellent quality, which surpasses image quality obtained in silver-salt photography, can be obtained in an ink-jet printer. Thus, the ink-jet printer has rapidly spread as a printer for office use or home use. Also, the ink-jet printer has rapidly spread in the field of sign and displays such as indoor and outdoor advertisement.

Ink to be used for an ink-jet printer are roughly classified into dye ink and pigment ink. When the dye ink is used, excellent coloring property can be obtained whereas there are demerits that water resistance and weather resistance are inferior. On the other hand, when the pigment ink is used, excellent water resistance and weather resistance can be obtained, but there is a demerit that coloring property is inferior to that of the dye ink. However, due to improvement in pigment-dispersing techniques in recent years, excellent coloring properties which are equal to those of dye ink can be realized. Therefore, as the ink used for an ink-jet printer, it is a recent trend to gradually shift from dye ink to pigment ink.

Also, pigment ink used for an ink-jet printer are roughly classified into an aqueous-type pigment ink and a solvent-type pigment ink.

The aqueous-type pigment ink mainly contains water as a dispersant for a pigment, and therefore that has a little less odor, but a density of the pigment cannot be made dense whereby there have defects of being inferior in printing density and sharpness of colors.

On the other hand, the solvent-type pigment ink is an ink which comprises a pigment dispersed in a solvent mainly comprising cyclohexanone or methyl ethyl ketone, and is excellent in high density and color sharpness. Also, the ink itself has excellent water resistance, so that it has spread in the field of an announcement, an advertisement, etc. It has, however, strong odor which greatly affects on a working environment of operators to handle the materials. Therefore, the operators are required to be a specific licensee for handling an organic solvent, and a special ventilation duct is also required to be provided.

As a method to solve these problems, an ink-jet system using oily ink has been proposed. The oily ink is an ink in which an oil-soluble dye, an organic pigment, an inorganic pigment, etc. is/are dissolved or dispersed in a solvent such as a paraffin, an ether, an alcohol, etc. When an image is recorded on an ink-receptive layer by using the oily ink, however, drying property of a solvent remained in the ink-receptive layer is poor so that it is required to dry the material for a long period of time. Therefore, it involves a problem that working efficiency is markedly lowered.

Thus, glycol ink in which a pigment is dispersed in a solvent mainly comprising a glycol ether has been developed. Specifically, it comprises polyoxyethylene glycol dialkyl ether, polyoxyethylene glycol monoalkyl ether, polypropylene glycol monoalkyl ether, etc. as a primary solvent, and contains 60 parts by weight or more of a glycol ether based on 100 parts by weight of the ink. This ink is a solvent-type pigment ink as newly developed. The glycol ink has less smell and is excellent in water resistance, as well as in this ink, defects of the conventional solvent ink have been resolved. Also, it has a merit that an evaporation rate of a solvent remained in an ink-receptive layer after recording is faster than that of the oily ink. In recent years, the glycol ink is spreading, but it involves a problem that the printed area is easily peeled off when that area is rubbed as compared with the conventional solvent-type ink. Thus, an ink-jet recording material suitable for glycol ink has been required.

As an ink-jet recording material to be used in an ink-jet recording method, two kinds of materials have generally been used. The one is a swelling type which generally comprises a resin absorbing a solvent in ink as a main constitutional component, and the other is a microporous type which comprises pigment particles and a resin as main constitutional components, and absorbs ink by voids in an ink-receptive layer having porous structure thereof.

As a recording material in which a microporous type ink-receptive layer is provided, it has been disclosed an ink-jet recording material in which a porous structural ink-receptive layer comprising silica particles and a water-soluble resin is provided on a substrate (for example, see Patent Literature 1). This recording material has excellent ink drying property, but this is a recording material designed for an aqueous ink, so that when a solvent ink, in particular, a glycol ink is used, scratch resistance after printing cannot be obtained. Therefore, it involves a fatal defect that the image is missed when the printed area is erroneously rubbed. Also, it has been disclosed an ink-jet recording material in which an ink-receptive layer having a porous structure and comprising particles and a non-water-soluble resin as main constitutional components has been provided (for example, see Patent Literatures 2 to 6). In these recording materials, the resin component(s) to be used is/are contained in an excessive amount to those of the particles and a porous structure with a higher void ratio cannot be realized, so that a long period of time is required for a drying procedure whereby a working efficiency is markedly lowered. Moreover, there have been disclosed an ink-jet recording material (for example, see Patent Literature 7) which comprises a porous layer containing water-insoluble organic particles as a front surface layer, or an ink-jet recording material (for example, see Patent Literature 8) which comprises a support and a gloss-appearing layer having a solvent absorbing property thereon, and contains a polymer soluble in an isoparaffin type hydrocarbon. However, these materials do not intend to solve the problems involved in an ink-jet recording system using the glycol ink which is an object of the present invention.

As a recording material in which a swelling type ink-receptive layer is provided, it has been disclosed an ink-jet recording material (for example, see Patent Literature 9) which employs a vinyl chloride-vinyl acetate copolymer as a resin capable of swelling or being dissolved in a solvent for ink, or an ink-jet recording material (for example, see Patent Literature 10) having an ink-receptive layer which mainly comprises an acrylic-type resin. When drying is sufficiently carried out after printing, these materials have excellent scratch resistance. However, drying for a long period of time is required since they are inferior in ink absorption property, and they cannot be preserved by laying the printed material on the other ones when a large number of materials are printed out so that working efficiency is remarkably lowered.

Patent Literature 1: JP 2000-238422A
Patent Literature 2: JP 2004-322552A
Patent Literature 3: JP 2004-330465A
Patent Literature 4: JP 2004-50509A
Patent Literature 5: JP 2000-335084A
Patent Literature 6: JP 2000-335082A Patent Literature 7: JP 2003-200649A
Patent Literature 8: JP Hei. 10-250218A
Patent Literature 9: JP 2004-106190A
Patent Literature 10: JP 2004-291561A

DISCLOSURE OF THE INVENTION

Problems to be Solved by the Invention

An object of the present invention is to provide an ink-jet recording method which gives excellent coloring property, ink drying property, and scratch resistance when printing is carried out with an ink-jet printer using glycol ink.

Means to Solve the Problems

The above-mentioned objects of the present invention have been basically accomplished by the following inventions.

(1) An ink-jet recording method for printing with a glycol ink which contains 60 parts by weight or more of glycol ether based on 100 parts by weight of the ink, comprising printing by ejecting the glycol ink on an ink-jet recording material which comprises a support, at least one porous ink-receptive layer which contains inorganic fine particles having an average secondary particle size of 500 nm or less and a resin binder provided on the support, and a front surface layer containing an acrylic resin emulsion provided on the ink-receptive layer.

(2) The ink-jet recording method according to (1), wherein an average particle size of the acrylic resin emulsion is 22 nm or more and 250 nm or less.

(3) The ink-jet recording method according to (1), wherein an average particle size of the acrylic resin emulsion is 50 nm or more and 100 nm or less.

(4) The ink-jet recording method according to (1), wherein a coated amount of the acrylic resin emulsion in a solid content is 50 mg/m$^2$ or more and 200 mg/m$^2$ or less.

(5) The ink-jet recording method according to (1), wherein the acrylic resin emulsion is a resin emulsion containing at least one of acrylic acid, methacrylic acid and an ester thereof as a polymerization component(s) in an amount of 50 parts by weight or more based on 100 parts by weight of a solid content of the resin emulsion.

(6) The ink-jet recording method according to (1), wherein a contained amount of the resin binder is 5 to 40% by weight based on an amount of the inorganic fine particles having an average secondary particle size of 500 nm or less.

(7) The ink-jet recording method according to (1), wherein the glycol ink is a glycol-type pigment ink.

(8) The ink-jet recording method according to (1), wherein the glycol ether in the glycol ink is at least one selected from the group consisting of polyoxyethylene glycol dialkyl ether, polyoxyethylene glycol monoalkyl ether and polypropylene glycol monoalkyl ether.

(9) The ink-jet recording method according to (1), wherein the support is a polyolefin resin-coated paper.

(10) An ink-jet recording set comprising: a glycol ink which contains 60 parts by weight or more of glycol ether based on 100 parts by weight of the ink; and an ink-jet recording material which comprises a support, at least one porous ink-receptive layer which contains inorganic fine particles having an average secondary particle size of 500 nm or less and a resin binder provided on the support, and a front surface layer containing an acrylic resin emulsion provided on the ink-receptive layer.

Effects of the Invention

According to the present invention, it is possible to provide a recording method which gives excellent coloring property, ink drying property, and scratch resistance when printing is carried out with an ink-jet printer using glycol ink.

BEST MODE TO CARRY OUT THE INVENTION

An ink-jet recording material to be used in the recording method of the present invention comprises a support, at least one porous ink-receptive layer which contains inorganic fine particles having an average secondary particle size of 500 nm or less and a resin binder provided on the support, and a front surface layer containing an acrylic resin emulsion provided on the ink-receptive layer. By using such an ink-jet recording material, excellent coloring property, ink drying property and scratch resistance can be realized when printing is carried out with an ink-jet printer using glycol ink.

To realize the effects of the present invention, it is required to use a resin emulsion which can swell or be dissolved in glycol ink or can absorb glycol ink. From such a point of view, an acrylic resin emulsion is utilized. Also, the front surface layer containing the acrylic resin emulsion of the present invention is a front surface layer formed by coating a coating solution containing the acrylic resin emulsion and drying the same. The term "acrylic resin emulsion" means dispersion of acrylic resin particles in water (vehicle), and does not intend W/O type emulsion or O/W type emulsion. The acrylic resin emulsion as used in the present invention refers to a resin emulsion containing 50 parts by weight or more of acrylic acid and/or methacrylic acid, and an ester(s) thereof as polymerization components based on 100 parts by weight of a solid content of the resin emulsion. The acrylic resin emulsion may contain other polymerization components such as vinyl acetate, styrene, acrylonitrile, acrylamide, urethane, etc. The acrylic resin emulsion may include: for example, a homopolymer emulsion of an acrylate or a methacrylate; a copolymer emulsion of an acrylate and a methacrylate; a copolymer emulsion of acrylic acid and/or methacrylic acid with an acrylate and/or a methacrylate; a copolymer emulsion of acrylic acid, methacrylic acid, an acrylate and/or a methacrylate with at least one of vinyl acetate, styrene, acrylonitrile, acrylamide, urethane, etc.

As the above-mentioned acrylic resin emulsion to be used in the present invention, there may be mentioned: for example, Acrit UW520, Acrit UW319SX, Acrit SE1645E, Acrit WEM031U, Acrit WEM290A each available from TAISEI FINE CHEMICAL CO., LTD.; XMM-2029, XMM-2031 each available from MITSUI CHEMICAL INC.; RIKABOND FK-850 available from CHUO RIKA KOGYO CO., LTD.; Acriset EX35, ST-200 each available from NIPPON SHOKUBAI CO., LTD.; E7584H available from DAIDO CHEMICAL CORPORATION, etc., all of which are commercially available so that these may be used by purchasing the same.

Also, the above-mentioned acrylic resin emulsion and other resin emulsion(s) may be mixed to provide a front surface layer. Such a resin emulsion may include a vinyl acetate type emulsion, an ethylene-vinyl acetate type emulsion, a chlorinated polyolefin type emulsion, a styrene-butadiene type copolymer (hereinafter referred to as "SBR") latex, an acrylonitrile-butadiene type copolymer (hereinafter referred to as "NBR") latex, a methyl meth-acrylate-butadiene type copolymer (hereinafter referred to as "MBR") latex, a carboxylated SBR latex, a carboxylated NBR latex, a carboxylated MBR latex, a urethane resin emulsion, etc. A mixing ratio of the resin emulsion to be used with the acrylic resin emulsion of the present invention in combination is preferably 50 parts by weight or less, more preferably 30 parts by weight or less based on 100 parts by weight of the solid content of the acrylic resin emulsion.

An average particle size of the acrylic resin emulsion to be used in the present invention is preferably 22 nm or more and 250 nm or less, more preferably 50 nm or more and 100 nm or less. The average particle size can be measured by using a LASER SCATTERING TYPE PARTICLE SIZE DISTRIBUTION ANALYZER (for example, LA910, manufactured by HORIBA, Ltd.), as a median diameter per number of particles.

A coated amount, on the solid content basis, of the acrylic resin emulsion which forms a front surface layer to be used in the present invention is preferably 50 mg/m$^2$ or more and 200 mg/m$^2$ or less, more preferably 80 mg/m$^2$ or more and 120 mg/m$^2$ or less. If it is less than the above-mentioned range, coloring property may be lowered, and scratch resistance at the printed area tends to be lowered. If it is too much, an ink solvent having permeated into the front surface layer is not rapidly reached to the ink-receptive layer as an under layer, so that an ink absorption property tends to be lowered. Also, in the front surface layer to be used in the present invention, a ratio of the acrylic resin emulsion is preferably 60% by weight or more, more preferably 80% by weight or more based on the whole solid content of the front surface layer.

To the front surface layer to be used in the present invention may be added an antiseptic agent, a surfactant, a coloring dye, a coloring pigment, a UV ray absorber, an antioxidant, a pigment dispersing agent, a defoaming agent, a leveling agent, a fluorescent brightener, a viscosity stabilizer, a pH controller, etc. according to required characteristics such as coating suitability, color tone adjustment and the like. When these materials are to be used, they are preferably used in an amount of less than 10 parts by weight, more preferably less than 5 parts by weight based on 100 parts by weight of the solid content of the resin emulsion which forms the front surface layer.

In the present invention, the reason why excellent coloring property and scratch resistance can be obtained when printing is carried out with an ink-jet printer using a glycol ink on an ink-jet recording material obtained by providing a front surface layer containing an acrylic resin emulsion on an ink-receptive layer provided on a support, can be estimated as follows.

The reason why coloring property is obtained can be estimated as follows. That is, when printing is carried out by using a glycol ink on the ink-jet recording material of the present invention, the ink liquid drop impacts on a front surface layer and then swells or dissolves an acrylic resin emulsion in the front surface layer, whereby an ink dot diameter thereof is suitably enlarged to improve coloring property. When no front surface layer is provided, an ink solvent rapidly permeates into a porous ink-receptive layer whereby an ink dot diameter thereof is not suitably enlarged and coloring property is inferior. When no ink-receptive layer is provided, an ink solvent is not absorbed, so that ink overflows on the front surface layer and no image is formed.

The reason why scratch resistance is obtained can be estimated as follows. That is, when printing is carried out by using a glycol ink on the ink-jet recording material of the present invention, an acrylic resin emulsion in a front surface layer rapidly swells or be dissolved therein, and simultaneously, permeates into an ink-receptive layer and rapidly absorbs a solvent component. The pigment component in the glycol ink is embedded in the front surface layer dissolved by the ink solvent, and is fixed uniformly in a film with the progress of drying of the ink solvent, whereby excellent scratch resistance is exhibited. When no front surface layer is provided, the pigment component does not constitute a film, so that peeling of a printed area may occur depending on the handling after the printing. When no ink-receptive layer is provided, no image is formed similarly, as mentioned above.

In the present invention, coating of a front surface layer coating solution on an ink-receptive layer is preferably carried out by firstly coating a coating solution of the ink-receptive layer on a support, drying the same to form sufficient voids in the ink-receptive layer, and then, coating a coating solution of the front surface layer in a coating amount which is controlled to not more than the void volume of the ink-receptive layer. By employing this method, the front surface layer coating solution is rapidly absorbed into the ink-receptive layer, and due to a suction power at the time of absorption, a phenomenon similar to the so-called "compression bonding" occurs in which the resin emulsion dispersed in the front surface layer coating solution is strongly pressed on the surface of the ink-receptive layer to generate a binding force with the ink-receptive layer. Thus, the front surface layer is fixed while retaining a clear interface on the ink-receptive layer.

The void volume of the ink-receptive layer referred to in the present invention can be obtained as a numerical value per a unit surface area (m$^2$) by multiplying a cumulated fine pore volume (mL/g) of fine pores with a fine pore radius from 3 nm to 400 nm at the ink-receptive layer portion measured and processed by using a mercury porosimeter (Name of measurement device: AUTOPORE II 9220, manufacturer: MICROMERITICS INSTRUMENT CORPORATION), by a coated solid content (g/m$^2$) of the ink-receptive layer.

Also, when coating is carried out by applying a shearing force to the coating solution of the front surface layer as much as possible, the resin emulsion in the front surface layer is uniformly arranged and a film with a uniform thickness can be formed. More specifically, it is preferred to carrying out the coating by applying a shearing force of 1000 (l/S) or more. As a coating method which provides an accurate coating amount, does not inhibit compression bonding of the front surface layer to the ink-receptive layer, and provides a shearing force, there may be specifically mentioned a slide bead system, a curtain system, an extrusion system, a slot die system, gravure roll system, an air knife system, a blade coating system, a rod bar coating system, etc. However, to coat the front surface layer coating solution in an amount not more than the void volume generated at the ink-receptive layer, it is preferred to employ a coating system in which a weight of the coating solution is weighed previously so as to be a predetermined coating amount. As the coating system, there may be mentioned a slide bead system, a curtain system, an extrusion system, a slot die system, gravure roll system, etc. In particular, the gravure roll system is preferred from the viewpoint of a degree of a shearing force provided to the front surface layer coating solution.

As a coating device using a gravure roll, there are a gravure coating device in which a movement direction of the gravure roller surface is the same as that of a substrate (in the case of the present invention, a support on which an ink-receptive layer is coated) to be contacted with the gravure roller surface, and a reverse gravure coating device in which a movement direction of the gravure roller surface is in an opposite direction to that of a substrate. In the present invention, when the gravure coating device is to be used, it is desirable to set a peripheral speed of the gravure roll lower than that of the substrate, so that coating is carried out by providing a shearing rate. The reverse gravure coating device is preferred since it can provide a large shearing rate. However, when these gravure coating devices are used, in case that a diameter of the gravure roll is large or a holding angle is large, a contacting time of the gravure roller and the ink-receptive layer becomes long. Thus, during contact with the gravure roll, the front surface layer coating solution is absorbed therein, so that physical contact between the front surface layer formed on the surface of the ink-receptive layer and the gravure roll occurs, whereby the front surface layer is disarranged, and a uniform front surface layer cannot sometimes be obtained. Therefore, it is desirable to optimize a coating rate, a diameter of the gravure roll, the line number, a contact angle of the substrate, etc.

It is preferred that a diameter of the roll to be used is made thin, and a contacting time is made as short as possible. Among the gravure rolls, it is particularly preferred to use a diagonal gravure roller (a gravure roller having diagonal grooves) having a roll diameter of 100 mm or less in reverse rotation. More preferred range of the roll diameter is 20 to 80 mm or so.

In the present invention, a method of coating the ink-receptive layer, and a method of coating a subbing layer optionally provided are not specifically limited, and conventionally known coating methods can be used. There may be mentioned, for example, a slide bead system, a curtain system, an extrusion system, an air knife system, a roll coating system, a rod bar coating system, etc.

As a support to be used in the present invention, there may be used a non-water absorptive support such as a film including a polyethylene, polypropylene, polyvinyl chloride, diacetate resin, triacetate resin, cellophane, an acrylic resin, polyethyleneterephthalate, polyethylenenaphthalate, etc., and a polyolefin resin-coated paper; and a water-absorptive support such as high-quality paper, art paper, coated paper, cast-coated paper, etc. Of these, a non-water absorptive support is preferred since it is excellent in water resistance. Furthermore, a polyolefin resin-coated paper is more preferred since it is available inexpensively. A thickness of these supports is preferably about 50 to 250 µm or so.

The polyolefin resin may include olefin homopolymer such as low density polyethylene, high density polyethylene, polypropylene, polybutene, polypentene; olefin copolymer obtained by copolymerizing two or more olefins such as ethylene-propylene copolymer; or mixture thereof. They may have various density or melt viscosity index (melt index), and may be used either singly or in combination of two or more.

To the polyolefin resin, there may be added various kinds of additives, for example, a white pigment such as titanium oxide, zinc oxide, talc and calcium carbonate; a fatty acid amide such as stearic acid amide and arachic acid amide; an aliphatic acid metal salt such as zinc stearate, calcium stearate, aluminum stearate and magnesium stearate; an antioxidant such as IRGANOX 1010 and IRGANOX 1076 commercially available from Ciba Specialty Chemicals Inc.; blue pigment or dye such as cobalt blue, ultramarine blue, sicilian blue and phthalocyanine blue; a magenta pigment or dye such as cobalt violet, fast violet, manganese violet; a fluorescent whitening agent; ultraviolet [UV] absorber; and the like, and they may optionally be used, preferably in combination.

When a support, in particular, a non-water absorptive support such as a film and a resin coated paper is used, a subbing layer mainly comprising a natural polymer compound or a synthetic resin is preferably provided on a side on which an ink-receptive layer is to be provided of the support. The subbing layer provided on the support mainly comprises a natural polymer compound such as gelatin and casein, or a synthetic resin. Such a synthetic resin may include an acryl resin, a polyester resin, a polyvinylidene chloride resin, a polyvinyl chloride resin, a polyvinyl acetate resin, a polystyrene resin, a polyamide resin, a polyurethane resin, etc. The subbing layer is preferably provided on the support with a thickness (dried thickness) of 0.01 to 5 µm, more preferably in the range of 0.01 to 2 µm.

On the support in the present invention, various kinds of back coating layer may be provided for the purpose of providing writability, antistatic property, conveying property, anticurl property, etc. In the back coating layer, an inorganic antistatic agent, an organic antistatic agent, a hydrophilic binder, a latex, a pigment, a curing agent, a surfactant, etc. may be included in an optional combination.

As the inorganic fine particles having an average secondary particle size of 500 nm or less to be used in the ink-receptive layer of the present invention, there may be mentioned various kinds of conventionally known fine particles such as amorphous synthetic silica, alumina, alumina hydrate, calcium carbonate, magnesium carbonate, titanium dioxide, etc. Of these, amorphous synthetic silica, alumina or alumina hydrate is preferred in view of ink absorption property and productivity.

The amorphous synthetic silica can be roughly classified into wet process silica, fumed silica, and others according to the preparation processes. The wet process silica can be further classified into a precipitation method silica, a gel method silica, and a sol method silica according to the preparation processes. The precipitation method silica can be prepared by reacting sodium silicate and sulfuric acid under alkaline conditions, and then, silica particles grown in particle size aggregated and precipitated. After that, they are processed through filtration, washing, drying, pulverization and classification to be a commercial reality. As the precipitation method silica, it is commercially available, for example, from TOSOH SILICA CORPORATION as NIPSIL, and from K.K. TOKUYAMA as TOKUSIL. The gel method silica can be produced by reacting sodium silicate and sulfuric acid under acidic conditions. During ripening, fine particles are dissolved and reprecipitation occurs in which the other primary particles are combined to each other, so that clear primary particles disappear and relatively hard agglomerated particles having internal void structure are formed. It is commercially available, for example, from TOSOH SILICA CORPORATION as NIPGEL, and from Grace Japan Co., Ltd. as SYLOID and SYLOJET. The sol method silica is also referred to as colloidal silica and can be obtained by heating and ripening silica sol which is obtained by metathesis of sodium silicate with an acid, etc., or by passing through an ion-exchange resin film. It is commercially available, for example, from NISSAN CHEMICAL INDUSTRIES, LTD. as SNOWTEX.

The fumed silica is also referred to as the dry process silica contrary to the wet process silica, and it can be generally prepared by a flame hydrolysis method. More specifically, it has generally been known a method of burning silicon tetrachloride with hydrogen and oxygen to prepare fumed silica, and silane such as methyltrichlorosilane and trichlorosilane may be used in place of silicon tetrachloride, singly or in admixture with the silicon tetrachloride. The fumed silica is commercially available from NIPPON AEROSIL K.K. as AEROSIL, and from K.K. TOKUYAMA as QS TYPE.

In the present invention, fumed silica is preferably used. An average primary particle size of the fumed silica to be used in the present invention is preferably 30 nm or less, and more preferably 15 nm or less to obtain higher glossiness. More preferred are to use those having an average primary particle size of 3 to 15 nm (particularly 3 to 10 nm), and having a specific surface area measured by the BET method of 200 $m^2/g$ or more (preferably 250 to 500 $m^2/g$). Incidentally, the average primary particle size referred to in the present invention means an average particle size of 100 primary particles existing in a predetermined surface area obtained according to electron microscopic observation in which diameters of the circles equivalent to the projected surface area of the respective primary particles are regarded as a particle size. The BET method mentioned in the present invention means one of methods for measuring a surface area of powder material by a gas phase adsorption method and is a method for obtaining a total surface area possessed by 1 g of a sample, i.e., a specific surface area, from an adsorption isotherm. In general, as an adsorption gas, nitrogen gas has frequently been used. A method of measuring an adsorption amount from the change in pressure or a volume of a gas to be adsorbed has most frequently been used. Most famous equation for representing isotherm of polymolecular adsorption is a Brunauer-Emmett-Teller equation which is also referred to as a BET equation and has widely been used for determining a surface area of a substance to be examined. A surface area can be obtained by measuring an adsorption amount based on the BET equation and multiplying the amount by a surface area occupied by the surface of one adsorbed molecule.

The fumed silica having the above-mentioned average primary particle size is preferably dispersed in the presence of a cationic compound. An average secondary particle size of the dispersed fumed silica is preferably 500 nm or less, more preferably 10 to 300 nm, further preferably 20 to 200 nm. For a dispersing method, it is preferred to provisionally mix the fumed silica and a dispersing medium with general propeller stirring, turbine type stirring, homomixer type stirring, etc., and then, to disperse the mixture by using a media mill such as a ball mill, a beads mill and a sand grinder, a pressure type dispersing machine such as a high pressure homogenizer and a ultra-high pressure homogenizer, a ultrasonic wave dispersing machine, and a thin film spin system disperser, etc. Incidentally, the average secondary particle size referred to in the present invention can be obtained by taking a picture by a transmittance type electron microscope. Easily and simply, the average secondary particle size can be obtained by using a LASER SCATTERING TYPE PARTICLE SIZE DISTRIBUTION ANALYZER (for example, manufactured by HORIBA, Ltd., LA910) as a median diameter per number of particles.

In the present invention, wet process silica pulverized to have an average secondary particle size of 500 nm or less may be preferably used. The wet process silica as used herein is preferably a precipitation method silica or a gel method silica, particularly preferably a precipitation method silica. As the wet process silica to be used in the present invention, wet process silica having an average primary particle size of 50 nm or less, preferably 3 to 40 nm, and an average agglomerated particle size of 5 to 50 μm is preferred. It is preferred to use the above wet process silica obtained by finely pulverizing the same up to an average secondary particle size of 500 nm or less, preferably 10 to 300 nm or so, more preferably 20 to 200 nm or so in the presence of a cationic compound.

The wet process silica prepared by the general method has an average aggregated particle size of 1 μm or more, so that it is used preferably after subjecting to fine pulverization. As the pulverization method, a wet dispersing method of mechanically pulverizing silica dispersed in an aqueous medium can be preferably used. At this time, increase in initial viscosity of the dispersion can be controlled, dispersion with a high concentration can be realized and pulverization and dispersion efficiencies are improved so that the particles can be pulverized finer. From the above reason, precipitation method silica having an average agglomerated particle size of 5 μm or more is preferably used. By using a dispersion with a high concentration, productivity of the recording material is improved.

A specific method for obtaining wet process silica fine particles having an average secondary particle size of 500 nm or less in the present invention is explained below. First, silica particles and a cationic compound are mixed in a dispersing medium mainly comprising water, and the mixture is dispersed by using at least one of dispersing devices such as a saw blade type dispersing device, a propeller blade type dispersing device, and a rotor stator type dispersing device to obtain a predispersion. If necessary, a suitable amount of a low boiling point solvent, etc., may be further added to the aqueous dispersing medium. A concentration of the solid content in the silica predispersion is preferably as high as possible, but if it is too high concentration, dispersing operation is impossible. Therefore, the solid concentration is preferably in the range of 15 to 40% by weight, more preferably 20 to 35% by weight. Next, the silica predispersion can be subjected to a mechanical means having a more potent shearing force to obtain a wet process silica dispersion having an average secondary particle size of 500 nm or less. As the mechanical means, those conventionally known in the art can be employed, and there may be used, for example, a media mill such as a ball mill, a beads mill and a sand grinder, a pressure type dispersing device such as a high-pressure homogenizer and an ultra high-pressure homogenizer, an ultrasonic wave dispersing device, and a thin-film spin type dispersing device, etc.

As the cationic compound to be used for dispersion of the above-mentioned fumed silica and wet process silica, a cationic polymer can be preferably used. As the cationic polymer, preferably used are polyethyleneimine, polydiallylamine, polyallylamine, alkylamine polymer, as well as polymers having a primary to tertiary amino group or a quaternary ammonium group as disclosed in Japanese Laid-Open Patent Publications No. Sho. 59-20696, No. Sho. 59-33176, No. Sho. 59-33177, No. Sho. 59-155088, No. Sho. 60-11389, No. Sho. 60-49990, No. Sho. 60-83882, No. Sho. 60-109894, No. Sho. 62-198493, No. Sho. 63-49478, No. Sho. 63-115780, No. Sho. 63-280681, No. Hei. 1-40371, No. Hei. 6-234268, No. Hei. 7-125411, No. Hei. 10-193776, etc. In particular, a diallylamine derivative is preferably used as the cationic polymer. A weight-average molecular weight of these cationic polymers is preferably 2,000 to 100,000 or so, particularly preferably 2,000 to 30,000 or so in view of dispersibility and a viscosity of the dispersion. An amount of the cationic polymer to be added is preferably in the range of 1 to 10% by weight based on the amount of the silica.

As the alumina to be used in the present invention, γ-alumina which is a γ type crystal of aluminum oxide is preferred, and of these, δ group crystal is preferred. The γ-alumina can be made fine to a primary particle size of 10 nm or so. In general, there may be used γ-alumina obtained by pulverizing secondary particle crystals having several thousands to several ten thousands nm with an ultrasonic wave, a high pressure homogenizer or a counter-collision type jet pulverizer, etc. to have an average secondary particle size of 500 nm or less, preferably 20 to 300 nm.

The alumina hydrate of the present invention can be represented by the structural formula of $Al_2O_3 \cdot nH_2O$ (n=1 to 3). Alumina hydrate can be generally obtained by conventionally known preparation methods such as hydrolysis of aluminum alkoxide such as aluminum isopropoxide, etc., neutralization of aluminum salt with an alkali, hydrolysis of aluminate, etc. An average secondary particle size of alumina hydrate to be used in the present invention is preferably 500 nm or less, more preferably 20 to 300 nm.

The above-mentioned alumina, and alumina hydrate to be used in the present invention can be used in the form of a dispersion as dispersed by a conventionally known dispersant such as acetic acid, lactic acid, formic acid, nitric acid and the like.

Among the inorganic fine particles as mentioned above, two or more kinds of inorganic fine particles may be used in combination. There may be mentioned, for example, a combination of finely pulverized wet process silica and fumed silica, a combination of finely pulverized wet process silica and alumina or alumina hydrate, and a combination of fumed silica and alumina or alumina hydrate. A ratio of the combination is not specifically limited.

In the ink-receptive layer of the present invention, a content of the inorganic fine particles having an average secondary particle size of 500 nm or less is preferably 50% by weight or more, more preferably 60% by weight or more, particularly preferably in the range of 65 to 90% by weight based on the whole solid content of the ink-receptive layer. The ink-receptive layer having such a high formulation ratio of the inorganic fine particles becomes a porous ink-receptive layer with a higher void ratio.

In the present invention, as a binder which constitutes the ink-receptive layer and to be used with the inorganic fine particles which also constitutes the ink-receptive layer, a resin binder having high transparency and providing higher permeability of ink is preferably used. The term "resin binder" as used herein means resin for supporting the inorganic fine particles in the ink-receptive layer, which possesses binder ability. The resin binder may be mentioned, for example, polyvinyl alcohol, gelatin, polyethyleneoxide, polyvinylpyrrolidone, polyacrylic acid, polyacrylamide, polyurethane, dextran, dextrin, carrageenan (κ, τ, λ, etc.), agar, pullulan, water-soluble polyvinylbutyral, hydroxyethyl cellulose, carboxymethyl cellulose, etc. These resin binders may be used in combination of 2 or more kinds. For using the resin binder, it is important that the resin binder does not clog or stop up the voids in the ink-receptive layer by swelling thereof at the initial permeation of the ink, and from this point of view, a resin binder having a relatively low swelling property at around room temperatures is preferably used. Preferred resin binder is a completely or partially-saponified polyvinyl alcohol, or a cationically-modified polyvinyl alcohol.

Among the polyvinyl alcohols, particularly preferred is a partially or completely-saponified polyvinyl alcohol having a saponification degree of 80% or more. An average polymerization degree thereof is preferably 200 to 5000.

The cationically-modified polyvinyl alcohol is a polyvinyl alcohol having a primary to tertiary amino group or a quaternary ammonium group at the main chain or side chain of the polyvinyl alcohol as disclosed in, for example, Japanese Laid-Open Patent Publication No. Sho. 61-10483.

In the present invention, in combination with the above-mentioned resin binder constituting the ink-receptive layer, a film hardening agent may optionally be used. Specific examples of the film hardening agent may include: an aldehyde type compound such as formaldehyde, glutaraldehyde; a ketone compound such as diacetyl, chloropentanedione; a compound having a reactive halogen such as bis(2-chloroethylurea)-2-hydroxy-4,6-dichloro-1,3,5-triazine, and those as disclosed in U.S. Pat. No. 3,288,775; a compound having a reactive olefin such as divinylsulfone, and those as disclosed in U.S. Pat. No. 3,635,718; a N-methylol compound as disclosed in U.S. Pat. No. 2,732,316; an isocyanate compound as disclosed in U.S. Pat. No. 3,103,437; an aziridine compound as disclosed in U.S. Pat. Nos. 3,017,280 and 2,983,611; a carbodiimide type compound as disclosed in U.S. Pat. No. 3,100,704; an epoxy compound as disclosed in U.S. Pat. No. 3,091,537; a halogen carboxyaldehyde compound such as mucochloric acid; a dioxane derivative such as dihydroxydioxane; an inorganic cross-linking agent such as chromium alum, zirconium sulfate, boric acid and a borate and borax, and they may be used independently or in combination of two or more. Among Of these, boric acid, borax and a borate are particularly preferred.

Also, as the resin binder constituting the ink-receptive layer, a resin binder having a keto group(s) may be used. The resin binder having a keto group(s) can be synthesized by a method of copolymerizing monomer having a keto group(s) and the other monomer, and the like. Specific examples of the monomer having a keto group(s) may include, for example, acrolein, diacetoneacrylamide, diacetone methacrylate, acetacetoxyethyl methacrylate, 4-vinylacetacetanilide, acetacetylallylamide, etc. Also, the keto group(s) may be introduced by the polymerization reaction, and for example, an acetoacetyl group can be introduced by a reaction of a hydroxy group or an amino group with diketene, and the like. Specific examples of the resin binder having a keto group(s) may include, for example, acetacetyl modified-polyvinyl alcohol, acetacetyl modified-cellulose derivatives, acetacetyl modified-starch, diacetoneacrylamide-modified polyvinyl alcohol, and a resin binder described in Japanese Laid-Open Patent Publication No. Hei. 10-157283, etc. In the present invention, a modified polyvinyl alcohol having a keto group(s) is particularly preferred. As the modified polyvinyl alcohol having a keto group(s), there may be mentioned acetacetyl modified-polyvinyl alcohol, diacetoneacrylamide-modified polyvinyl alcohol, etc.

The acetoacetyl-modified polyvinyl alcohol can be prepared by a conventionally known method such as a reaction of polyvinyl alcohol with diketene, etc. An acetoacetylation degree thereof is preferably 0.1 to 20 mol %, more preferably 1 to 15 mol %. A saponification degree thereof is preferably 80 mol % or more, more preferably 85 mol % or more. A polymerization degree thereof is preferably 500 to 5000, more preferably 2000 to 4500.

The diacetone acrylamide-modified polyvinyl alcohol can be prepared by a conventionally known method such as saponification of a diacetone acrylamide-vinyl acetate copolymer, etc. A content of the diacetone acrylamide unit is preferably in the range of 0.1 to 15 mol %, more preferably in the range of 0.5 to 10 mol %. A saponification degree thereof is preferably 85 mol % or more, and a polymerization degree thereof is preferably 500 to 5000.

In the present invention, a resin binder having a keto group(s) to be contained in the ink-receptive layer is cross-linked by the cross-linking agent. Such a cross-linking agent may include the following compounds.

(1) Polyamine Derivatives

Aliphatic Polyamine Derivatives;
  Alkylene diamine (for example, ethylene diamine, propylene diamine, trimethylene diamine, tetramethylene diamine, hexamethylene diamine, etc.),
  Polyalkylenepolyamine (for example, diethylenetriamine, iminobis(propylamine), bis(hexamethylene)triamine, tri-ethylenetetramine, tetraethylenepentamine, pentaethylenehexamine, etc.),
  Alkyl or hydroxyalkyl-substituted product of the above (for example, aminoethylethanolamine, methyliminobis (propylamine), etc.)
  Alicyclic or hetrocyclic ring-containing aliphatic polyamine (for example, 3,9-bis(3-aminopropyl)-2,4,8, 10-tetraoxaspiro[5,5]undecane, etc.)

Aromatic ring-containing aliphatic amines (for example, xylilenediamine, tetrachloro-p-xylilenediamine, etc.)

$C_4$ to $C_{15}$ Alicyclic Polyamine;

For example, 1,3-diaminocyclohexane, isophoronediamine, menthane diamine, 4,4'-methylenedicyclohexanediamine (hydrogenated methylenedianiline), etc.

$C_4$ to $C_{15}$ Heterocyclic Polyamine;

For example, piperazine, N-aminoethylpiperazine, 1,4-diaminopiperazine, etc.

$C_6$ to $C_{20}$ Aromatic Polyamines;

Unsubstituted aromatic polyamine (for example, 1,2-, 1,3- and 1,4-phenylenediamine, 2,4'- and 4,4'-diphenylmethanediamine, polyphenylpolymethylenepolyamine, diaminodiphenylsulfone, benzidine, thiodianiline, bis(3,4-diaminophenyl)sulfone, 2,6-diaminopyridine, m-aminobenzylamine, tri-phenylmethane-4,4',4"-triamine, naphthylenediamine, etc.)

Aromatic polyamine in which the ring is substituted by alkyl group (for example, $C_1$ to $C_4$ alkyl group) (for example, 2,4- and 2,6-tolylenediamine, crude tolylenediamine, diethyltolylenediamine, 4,4'-diamino-3,3'-dimethyldiphenylmethane, 4,4'-bis(o-toluidine), dianisidine, diaminoditolylsulfone, 1,3-dimethyl-2,4-diaminobenzene, 1,3-diethyl-2,4-diaminobenzene, 1,3-dimethyl-2,6-diaminobenzene, 1,4-diethyl-2,5-diaminobenzene, 1,4-diisopropyl-2,5-diaminobenzene, 1,4-dibutyl-2,5-diaminobenzene, 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene, 1-methyl-3,5-diethyl-2,6-diaminobenzene, 2,3-dimethyl-1,4-diaminonaphthalene, 2,6-dimethyl-1,5-diaminonaphthalene, 2,6-diisopropyl-1,5-diaminonaphthalene, 2,6-dibutyl-1,5-diaminonaphthalene, 3,3',5,5'-tetramethylbenzidine, 3,3',5,5'-tetraisopropylbenzidine, 3,3',5,5'-tetramethyl-4,4'-diaminodiphenylmethane, 3,3',5,5'-tetraethyl-4,4'-diaminodiphenylmethane, 3,3',5,5'-tetraisopropyl-4,4'-diaminodiphenylmethane, 3,3',5,5'-tetrabutyl-4,4'-diaminodiphenylmethane, 3,5-diethyl-3'-methyl-2',4-diaminodiphenylmethane, 3,5-diisopropyl-3'-methyl-2',4-diaminodiphenylmethane, 3,3'-diethyl-2,2'-diaminodiphenylmethane, 4,4'-diamino-3,3'-dimethyldiphenylmethane, 3,3',5,5'-tetraethyl-4,4'-diaminobenzophenone, 3,3',5,5'-tetraisopropyl-4,4'-diaminobenzophenone, 3,3',5,5'-tetraethyl-4,4'-diaminodiphenyl ether, 3,3',5,5'-tetraisopropyl-4,4'-diaminodiphenylsulfone, etc.)

Polyamidepolyamine;

For example, a low molecular weight (for example, weight-average molecular weight of 200 to 5000) polyamidepolyamine obtained by condensation of a dicarboxylic acid (dimmer acid, etc.) with an excess amount (2 mol or more per mol of the acid) of a polyamine (the above-mentioned alkylene diamine, polyalkylenepolyamine, etc.), etc.

Polyether Polyamine;

For example, a hydrogenated product of a cyanoethylated product of a polyether polyol (polyalkyleneglycol, etc.) having a weight-average molecular weight of 100 to 5000, etc.

(2) Dicyanediamide Derivatives;

Dicyanediamide, dicyanediamide-formalin polycondensate, dicyanediamide-diethylenetriamine polycondensate, etc.

(3) Hydrazine Compound;

Hydrazine, monoalkyl hydrazine, inorganic salts (for example, inorganic salts of hydrochloric acid, sulfuric acid, nitric acid, nitrous acid, phosphoric acid, thiocyanic acid, carbonic acid, etc.) of hydrazine, organic salts (for example, organic salts of formic acid, oxalic acid, etc.) of hydrazine.

(4) Polyhydrazide Compound (Dihydrazide, Trihydrazide);

Carbohydrazide, succinic dihydrazide, adipic acid dihydrazide, citric acid trihydrazide, sebacic acid dihydrazide, isophthalic acid dihydrazide, terephthalic acid dihydrazide, etc.

(5) Aldehyde Derivatives;

Monoaldehydes such as formaldehyde, acetaldehyde, propionaldehyde, butylaldehyde, chrotonaldehyde and benzaldehyde, dialdehydes such as glyoxal, maronic dialdehyde, succinic dialdehyde, glutaric dialdehyde, maleic dialdehyde, 1,8-octanedial, phthalaldehyde, isphthalaldehyde, terephthalaldehyde and both ends aldehyde-bearing PVA, a side chain aldehyde-containing copolymer obtained by saponification of an allylidene diacetate-vinyl acetate copolymer, dialdehyde starch, polyacrolein, etc.

(6) Methylol Compound;

Methylol phosphine, dimethylol urea, dimethylol melamine, trimethylol melamine, urea resin-initial polymerized product, melamine resin-initial polymerized product, etc.

(7) Activated Vinyl Compound;

Divinylsulfone type compound, β-hydroxyethylsulfone type compound, etc.

(8) Epoxy Compound;

Epichlorohydrin, ethyleneglycol diglycidyl ether, polyethyleneglycol diglycidyl ether, glycerin di- or triglycidyl ether, 1,6-hexanediol diglycidyl ether, trimethylolpropane triglycidyl ether, diglycidylaniline, diglycidyl amine, polyepoxy compound, etc.

(9) Isocyanate Type Compound;

There may be mentioned tolylenediisocyanate, hydrogenated tolylenediisocyanate, trimethylolpropane-tolylenediisocyanate adduct, triphenylmethanetriisocyanate, methylenebis-4-phenylmethanetriisocyanate, isophoronediisocyanate, and ketoxime-block products or phenol-block products thereof, polyisocyanate, etc.

(10) Phenol Type Compound;

Phenol type resin-initial condensate, resorcinol type resin, etc.

(11) Polyvalent Metal Salts;

Zirconium salts (zirconium nitrate, basic zirconium carbonate, zirconium acetate, zirconium sulfate, zirconium oxychloride, zirconium chloride, zirconium hydroxychloride, zirconium carbonate, ammonium zirconiumcarbonate, potassium zirconium-carbonate, fluorinated zirconium compound, etc.)

Titanium salts (titanium tetrachloride, titanium lactate, tetraisopropyl titanate, etc.)

Aluminum salts (aluminum chloride, aluminum sulfate, aluminum lactate, etc.)

Calcium salts (calcium chloride, calcium sulfate, calcium acetate, calcium propionate, etc.)

Magnesium salts (magnesium chloride, magnesium sulfate, etc.)

Zinc salts (zinc chloride, zinc sulfate, zinc acetate, etc.)

Among the above-mentioned cross-linking agents, a polyhydrazide compound, and a polyvalent metal salt are preferred. Of these polyhydrazide compounds, a dihydrazide compound is particularly preferred, and furthermore, adipic aciddihydrazide and/or succinic acid dihydrazide is/are more preferred. As the polyvalent metal salt, zirconium salts are particularly preferred, and furthermore, zirconium oxychloride and/or zirconium nitrite is more preferred. An additive amount of the cross-linking agent is suitably in the range of 1 to 40% by weight based on the amount of the resin binder having a keto group(s), more preferably in the range of 2 to 30% by weight, particularly preferably in the range of 3 to 20% by weight.

In the present invention, a completely or partially-saponified polyvinyl alcohol or cationically modified-polyvinyl alcohol and a resin binder having a keto group(s) may be used in combination, and in such a case, a film hardening agent or cross-linking agent may be used in combination.

In the present invention, in combination with the above-mentioned a resin binder having a keto group(s), other conventionally known resin binder(s) may further be used. For example, cellulose derivatives such as carboxymethylcellulose and hydroxypropylcellulose, starch or various kinds of modified starch, gelatin or various kinds of modified gelatin, chitosan, carrageenan, casein, soybean protein, polyvinyl alcohol or various kinds of modified polyvinyl alcohol, polyvinylpyrrolidone, polyacrylamide, etc. may optionally be used in combination. Moreover, as a resin binder(s), various kinds of latex(es) may be used in combination.

A content of the resin binder in the ink-receptive layer is preferably in the range of 5 to 40% by weight, particularly preferably in the range of 10 to 30% by weight based on the amount of the above-mentioned inorganic fine particles having an average secondary particle size of 500 nm or less.

A dried coating amount of the ink-receptive layer is preferably in the range of 10 to 50 $g/m^2$, more preferably in the range of 12 to 40 $g/m^2$, particularly preferably in the range of 15 to 35 $g/m^2$ in terms of the inorganic fine particles having an average secondary particle size of 500 nm or less. To the ink-receptive layer, a cationic polymer, an antiseptic agent, a surfactant, a coloring dye, a coloring pigment, a UW ray absorber, an antioxidant, a dispersing agent for a pigment, a defoaming agent, a leveling agent, a fluorescent brightener, a viscosity stabilizer, a pH controller, etc., may be further added.

In the ink-receptive layer of the present invention, various kinds of oil drops may be further contained to improve brittleness of the film. Such oil drops may include a hydrophobic high boiling point organic solvent (for example, liquid paraffin, dioctyl phthalate, tricresyl phosphate, silicone oil, etc. having a solubility in water at room temperature of 0.01% by weight or less, or polymer particles (for example, particles in which one or more polymerizable monomers such as styrene, butyl acrylate, divinylbenzene, butyl methacrylate, hydroxyethyl methacrylate, etc. are polymerized). Such oil drops are preferably used in the range of 10 to 50% by weight based on the amount of the resin binder.

The ink-jet recording method according to the present invention is a recording method of printing by ejecting the glycol ink as mentioned hereinbelow on the ink-jet recording material as mentioned above. Said printing can be printing with an ink-jet printer which employs ink-jet recording system. The ink-jet recording system in the present invention means a printing system based on various kinds of conventionally-known ink-jet technologies, including: various continuous ink-jet systems such as a binary deflection system, a multiple deflection system and a continuous deflection system; and various on-demand ink-jet systems such as a thermal ink-jet system and a piezoelectric ink-jet system.

As the glycol ink as used in the present invention, there may be mentioned a glycol ink in which a solvent mainly comprises a glycol ether. The glycol ink is preferably a glycol-type pigment ink in which a pigment is dispersed in a solvent mainly comprising a glycol ether. A glycol ether refers to glycol ether compounds in which one or both of hydroxyl groups in glycol is/are etherified. The pigment may be an organic pigment and an inorganic pigment. The glycol ink as used in the present invention is a glycol ink which contains 60 parts by weight or more of glycol ether based on 100 parts by weight of the ink. The glycol ether may include polyoxyethylene glycol dialkyl ether, polyoxyethylene glycol monoalkyl ether, polypropylene glycol monoalkyl ether, etc.

EXAMPLES

In the following, the present invention is explained in detail by referring to Examples, but the contents of the present invention are not limited by these Examples. Incidentally, all the terms "part(s)" and "%" each means "parts by weight" and "% by weight", respectively.

<<Preparation of Recording Sheet 1>>
<Preparation of Polyolefin Resin-coated Paper Support>

A mixture of a bleached kraft pulp of hardwood (LBKP) and a bleached sulfite pulp of softwood (NBSP) with a weight ratio of 1:1 was subjected to beating until it becomes 300 ml by the Canadian Standard Freeness to prepare a pulp slurry. To the slurry were added alkyl ketene dimer in an amount of 0.5% based on the amount of the pulp as a sizing agent, polyacrylamide in an amount of 1.0% based on the amount of the pulp as a strengthening additive of paper, cationic starch in an amount of 2.0% based on the amount of the pulp, and a polyamide epichlorohydrin resin in an amount of 0.5% based on the amount of the pulp, and the mixture was diluted with water to prepare a slurry with a concentration of 1%. This slurry was made paper by a tourdrinier paper machine to have a basis weight of 170 $g/m^2$, dried and subjected to moisture conditioning to prepare a base paper for a polyolefin resin-coated paper. A polyethylene resin composition comprising 100 parts of a low density polyethylene having a density of 0.918 $g/cm^3$ and 10 parts of anatase type titanium dioxide dispersed uniformly in the resin was melted at 320° C. and the melted resin composition was subjected to extrusion coating on a surface of the above-mentioned base paper with a thickness of 35 μm and subjected to extrusion coating by using a cooling roller subjected to slightly roughening treatment to make a front surface (a side to be coated an ink-receptive layer). Onto the other surface of the base paper, a blended resin composition comprising 70 parts of a high density polyethylene resin having a density of 0.962 $g/cm^3$ and 30 parts of a low density polyethylene resin having a density of 0.918 $g/cm^3$ was melted similarly at 320° C. and the melted resin composition was subjected to extrusion coating with a thickness of 30 μm and subjected to extrusion coating by using a cooling roller subjected to roughening treatment to make a back surface.

Onto the surface of the above-mentioned polyolefin resin-coated paper support was applied a high frequency corona discharge treatment, and a subbing layer having the following composition was coated so that an attached amount of gelatin became 60 $mg/m^2$, and was dried.

| <Subbing layer> | |
|---|---|
| Gelatin | 100 parts |
| 2-Ethylhexyl sulfosuccinate | 2 parts |
| Chrome alum | 8 parts |

Onto the above-mentioned subbing layer, Ink-receptive layer coating solution 1 having the following composition was coated by using a slide bead coating device, and dried by successively blowing a warm air at 35° C. and 50° C. A coating amount of the ink-receptive layer coating solution was 21 g/m² in terms of the silica solid content. After completion of drying, a void volume was measured by using a mercury porosimeter (Name of measurement device: AUTO-PORE II 9220, manufacturer: MICROMERITICS INSTRUMENT CORPORATION), and was 25 ml/m². Moreover, Front surface layer coating solution 1 having the following composition was coated by using a coating device which uses a diagonal gravure roller, and dried by blowing a warm air at 50° C. to obtain Recording sheet 1. The diagonal gravure roller herein used is a gravure roller having a diameter of 60 mm, a diagonal angle of 45°, a line number of 90 lines/inch, and a groove depth of 110 μm, and used with reverse rotation. A coating amount of the ink-receptive layer coating solution was 21 g/m² in terms of the silica solid content, and a coating amount of the front surface layer coating solution was made 100 mg/m² in terms of the resin emulsion solid content. Incidentally, a wet coating amount of the front surface layer coating solution was set to 20 g/m² by adjusting a rotation number of the diagonal gravure roller. The wet coating amount was obtained from a decreased amount of the coating solution per a unit time during the coating. When the front surface layer coating solution was coated on the ink-receptive layer, the solvent in the coating solution was immediately absorbed in voids of the ink-receptive layer, and a uniform coated surface could be obtained.

<Preparation of Silica Dispersion 1>

To water were added 4 parts of dimethyldiallyl ammonium chloride homopolymer (weight-average molecular weight: 9,000) and 100 parts of fumed silica (average primary particle size: 7 nm, specific surface area: 300 m²/g) to prepare a predispersion, then, it was treated by a high pressure homogenizer to prepare Silica dispersion having a concentration of the solid content of 20%. An average secondary particle size was measured by using LA910 manufactured by HORIBA, LTD., and was 130 nm.

| <Ink-receptive layer Coating solution 1> | |
|---|---|
| Silica dispersion 1 | 100 parts (as a silica solid content) |
| Polyvinyl alcohol (Saponification degree: 88%, average degree of polymerization: 3500) | 23 parts |
| Boric acid | 4 parts |
| Nonionic surfactant (Polyoxyethylene alkyl ether) | 0.3 part |

Adjusted with water to have a concentration of the solid content of 12.85%.

<Front Surface Layer Coating Solution 1>
Cationic acryl resin emulsion (concentration of the solid content: 32%)
(ACRIT UW520, available from TAISEI FINE CHEMICAL CO., LTD., an average particle size: 50 nm)
Diluted with water to have a concentration of the solid content of 0.5%.

<<Preparation of Recording Sheet 2>>
Recording sheet 2 was prepared in the same manner as in Recording sheet 1 except for changing Surface layer coating solution 1 in the above-mentioned Recording sheet 1 to Surface layer coating solution 2 having the following composition.

<Front Surface Layer Coating Solution 2>
Cationic styrene-acryl resin emulsion (concentration of the solid content: 30%)
(ACRIT UW319SX, available from TAISEI FINE CHEMICAL CO., LTD., an average particle size: 50 nm)
Diluted with water to have a concentration of the solid content of 0.5%.

<<Preparation of Recording Sheet 3>>
Recording sheet 3 was prepared in the same manner as in Recording sheet 1 except for changing Front surface layer coating solution 1 in the above-mentioned Recording sheet 1 to Front surface layer coating solution 3 having the following composition.

<Front Surface Layer Coating Solution 3>
Styrene-acryl resin emulsion (concentration of the solid content: 30%)
(XMM-2029, available from MITSUI CHEMICAL INC., an average particle size: 69 nm)
Diluted with water to have a concentration of the solid content of 0.5%.

<<Preparation of Recording Sheet 4>>
Recording sheet 4 was prepared in the same manner as in Recording sheet 1 except for changing Front surface layer coating solution 1 in the above-mentioned Recording sheet 1 to Front surface layer coating solution 4 having the following composition.

<Front Surface Layer Coating Solution 4>
Anionic acrylic resin emulsion (concentration of the solid content: 42.8%)
(ACRISET EX35, available from NIPPON SHOKUBAI CO., LTD., an average particle size: 90 nm)
Diluted with water to have a concentration of the solid content of 0.5%.

<<Preparation of Recording Sheet 5>>
Recording sheet 5 was prepared in the same manner as in Recording sheet 1 except for changing Front surface layer coating solution 1 in the above-mentioned Recording sheet 1 to Front surface layer coating solution 5 having the following composition.

<Front Surface Layer Coating Solution 5>
Anionic acrylic resin emulsion (concentration of the solid content: 40.5%)
(ACRIT SE1645E, available from TAISEI FINE CHEMICAL CO., LTD., an average particle size: 100 nm)
Diluted with water to have a concentration of the solid content of 0.5%.

<<Preparation of Recording Sheet 6>>
Recording sheet 6 was prepared in the same manner as in Recording sheet 1 except for changing Front surface layer coating solution 1 in the above-mentioned Recording sheet 1 to Front surface layer coating solution 6 having the following composition.

<Front Surface Layer Coating Solution 6>
Urethane acryl resin emulsion (concentration of the solid content: 40%)
(ACRIT WEM031U, available from TAISEI FINE CHEMICAL CO., LTD., an average particle size: 100 nm)
Diluted with water to have a concentration of the solid content of 0.5%.

<<Preparation of Recording Sheet 7>>
Recording sheet 7 was prepared in the same manner as in Recording sheet 1 except for changing Front surface layer coating solution 1 in the above-mentioned Recording sheet 1 to Front surface layer coating solution 7 having the following composition.

<Front Surface Layer Coating Solution 7>
Styrene-acryl resin emulsion (concentration of the solid content: 20%)
(XMM-2031, available from MITSUI CHEMICAL INC., an average particle size: 22 nm)
Diluted with water to have a concentration of the solid content of 0.5%.

<<Preparation of Recording Sheet 8>>
Recording sheet 8 was prepared in the same manner as in Recording sheet 1 except for changing Front surface layer coating solution 1 in the above-mentioned Recording sheet 1 to Front surface layer coating solution 8 having the following composition.
<Front Surface Layer Coating Solution 8>
Urethane acryl resin emulsion (concentration of the solid content: 30%)
(ACRIT WEM290A, available from TAISEI FINE CHEMICAL CO., LTD., an average particle size: 105 nm)
Diluted with water to have a concentration of the solid content of 0.5%.

<<Preparation of Recording Sheet 9>>
Recording sheet 9 was prepared in the same manner as in Recording sheet 1 except for changing Front surface layer coating solution 1 in the above-mentioned Recording sheet 1 to Front surface layer coating solution 9 having the following composition.
<Front Surface Layer Coating Solution 9>
Cationic acryl resin emulsion (concentration of the solid content: 45%)
(RIKABOND FK-850, available from CHIRIKA CO., LTD., an average particle size: 140 nm)
Diluted with water to have a concentration of the solid content of 0.5%.

<<Preparation of Recording Sheet 10>>
Recording sheet 10 was prepared in the same manner as in Recording sheet 1 except for changing Front surface layer coating solution 1 in the above-mentioned Recording sheet 1 to Front surface layer coating solution 10 having the following composition.
<Front Surface Layer Coating Solution 10>
Acrylate type resin emulsion (concentration of the solid content: 40%)
(ST-200, available from NIPPON SHOKUBAI CO., LTD., an average particle size: 250 nm)
Diluted with water to have a concentration of the solid content of 0.5%.

<<Preparation of Recording Sheet 11>>
Recording sheet 11 was prepared in the same manner as in Recording sheet 1 except for changing Front surface layer coating solution 1 in the above-mentioned Recording sheet 1 to Front surface layer coating solution 11 having the following composition.
<Front Surface Layer Coating Solution 11>
Polyester resin emulsion (concentration of the solid content: 30%)
(Elitel KZA3556, available from UNITIKA LTD., an average particle size: 40 nm)
Diluted with water to have a concentration of the solid content of 0.5%.

<<Preparation of Recording Sheet 12>>
Recording sheet 12 was prepared in the same manner as in Recording sheet 1 except for changing Front surface layer coating solution 1 in the above-mentioned Recording sheet 1 to Front surface layer coating solution 12 having the following composition.
<Front Surface Layer Coating Solution 12>
Polystyrene type resin emulsion (concentration of the solid content: 50%)
(NIPOL 1577, available from ZEON CORPORATION, an average particle size: 40 nm)
Diluted with water to have a concentration of the solid content of 0.5%.

<<Preparation of Recording Sheet 13>>
Recording sheet 13 was prepared in the same manner as in Recording sheet 1 except for changing Front surface layer coating solution 1 in the above-mentioned Recording sheet 1 to Front surface layer coating solution 13 having the following composition.
<Front Surface Layer Coating Solution 13>
Styrene-butadiene type resin emulsion (concentration of the solid content: 50%)
(NIPOL LX433C, available from ZEON CORPORATION, an average particle size: 100 nm)
Diluted with water to have a concentration of the solid content of 0.5%.

<<Preparation of Recording Sheet 14>>
Recording sheet 14 was prepared in the same manner as in Recording sheet 1 except for changing Front surface layer coating solution 1 in the above-mentioned Recording sheet 1 to Front surface layer coating solution 14 having the following composition.
<Front Surface Layer Coating Solution 14>
Ester-ether type resin emulsion (concentration of the solid content: 38%)
(SUPER FLEX 150HS, available from DAIICHI INDUSTRIAL CO., LTD., an average particle size: 110 nm)
Diluted with water to have a concentration of the solid content of 0.5%.

<<Preparation of Recording Sheet 15>>
Recording sheet 15 was prepared in the same manner as in Recording sheet 1 except for changing Front surface layer coating solution 1 in the above-mentioned Recording sheet 1 to Front surface layer coating solution 15 having the following composition.
<Front Surface Layer Coating Solution 15>
Polystyrene type resin emulsion (concentration of the solid content: 50%)
(NIPOL LX303A, available from ZEON CORPORATION, an average particle size: 160 nm)
Diluted with water to have a concentration of the solid content of 0.5%.

<<Preparation of Recording Sheet 16>>
Recording sheet 16 was prepared in the same manner as in Recording sheet 1 except for changing Front surface layer coating solution 1 in the above-mentioned Recording sheet 1 to Front surface layer coating solution 16 having the following composition.
<Front Surface Layer Coating Solution 16>
Ethylene-vinyl chloride resin emulsion (concentration of the solid content: 30%)
(SUMIELITE 1210, available from SUMITOMO CHEMICAL CO., LTD., an average particle size: 200 nm)
Diluted with water to have a concentration of the solid content of 0.5%.

<<Preparation of Recording Sheet 17>>
Recording sheet 17 was prepared in the same manner as in Recording sheet 1 except for changing Front surface layer coating solution 1 in the above-mentioned Recording sheet 1 to Front surface layer coating solution 17 having the following composition.
<Front Surface Layer Coating Solution 17>
Ethylene-vinyl acetate resin emulsion (concentration of the solid content: 30%)

(SUMIKAFLEX 500, available from SUMITOMO CHEMICAL CO., LTD., an average particle size: 300 nm)
Diluted with water to have a concentration of the solid content of 0.5%.

<<Preparation of Recording Sheet 18>>
Recording sheet 18 was prepared in the same manner as in Recording sheet 1 except for changing Front surface layer coating solution 1 in the above-mentioned Recording sheet 1 to Front surface layer coating solution 18 having the following composition.
<Front Surface Layer Coating Solution 18>
Vinyl chloride type resin emulsion (concentration of the solid content: 50%)
(VINYBLAN 375, available from NISSIN CHEMICAL INDUSTRY CO., LTD., an average particle size: 460 nm)
Diluted with water to have a concentration of the solid content of 0.5%.

<<Preparation of Recording Sheet 19>>
Recording sheet 19 was prepared in the same manner as in Recording sheet 1 except for changing Front surface layer coating solution 1 in the above-mentioned Recording sheet 1 to Front surface layer coating solution 19 having the following composition.
<Front Surface Layer Coating Solution 19>
Acryl resin emulsion (concentration of the solid content: 20%)
(E7584H, available from DAIDO CHEMICAL CORPORATION, an average particle size: 310 nm)
Diluted with water to have a concentration of the solid content of 0.5%.

<<Preparation of Recording Sheet 20>>
Recording sheet 20 was prepared in the same manner as in Recording sheet 1 except for making a concentration of the solid content of Front surface layer coating solution in the above-mentioned Recording sheet 1 to 0.2%. A coating amount of the Front surface layer coating solution was 40 mg/m$^2$ in terms of the solid content of the resin emulsion.

<<Preparation of Recording Sheet 21>>
Recording sheet 21 was prepared in the same manner as in Recording sheet 1 except for making a concentration of the solid content of Front surface layer coating solution in the above-mentioned Recording sheet 1 to 0.25%. A coating amount of the Front surface layer coating solution was 50 mg/m$^2$ in terms of the solid content of the resin emulsion.

<<Preparation of Recording Sheet 22>>
Recording sheet 22 was prepared in the same manner as in Recording sheet 1 except for making a concentration of the solid content of Front surface layer coating solution in the above-mentioned Recording sheet 1 to 0.40%. A coating amount of the Front surface layer coating solution was 80 mg/m$^2$ in terms of the solid content of the resin emulsion.

<<Preparation of Recording Sheet 23>>
Recording sheet 23 was prepared in the same manner as in Recording sheet 1 except for making a concentration of the solid content of Front surface layer coating solution in the above-mentioned Recording sheet 1 to 0.60%. A coating amount of the Front surface layer coating solution was 120 mg/m$^2$ in terms of the solid content of the resin emulsion.

<<Preparation of Recording Sheet 24>>
Recording sheet 24 was prepared in the same manner as in Recording sheet 1 except for making a concentration of the solid content of Front surface layer coating solution in the above-mentioned Recording sheet 1 to 1.0%. A coating amount of the Front surface layer coating solution was 200 mg/m$^2$ in terms of the solid content of the resin emulsion.

<<Preparation of Recording Sheet 25>>
Recording sheet 25 was prepared in the same manner as in Recording sheet 1 except for making a concentration of the solid content of Front surface layer coating solution in the above-mentioned Recording sheet 1 to 1.2%. A coating amount of the Front surface layer coating solution was 240 mg/m$^2$ in terms of the solid content of the resin emulsion.

<<Preparation of Recording Sheet 26>>
Recording sheet 26 was prepared by not providing Front surface layer coating solution in the above-mentioned Recording sheet 1.

<<Preparation of Recording Sheet 27>>
Recording sheet 27 was prepared in the same manner as in Recording sheet 26 except for changing the ink-receptive layer coating solution 1 in the above-mentioned Recording sheet 26 to the ink-receptive layer coating solution 2 having the following composition.

| <Ink-receptive layer coating solution 2> | |
|---|---|
| Silica dispersion 1 | 100 parts (as a silica solid content) |
| Cationic styrene-acryl resin emulsion (concentration of the solid content: 32%) (ACRIT UW520, available from TAISEI FINE CHEMICAL CO., LTD., an average particle size: 50 nm) | 40 parts |
| Nonionic surfactant (Polyoxyethylene alkyl ether) | 0.3 part |

Adjusted with water to have a concentration of the solid content of 12.85%.

<<Preparation of Recording Sheet 28>>
Recording sheet 28 was prepared in the same manner as in Recording sheet 26 except for changing the ink-receptive layer coating solution 1 in the above-mentioned Recording sheet 26 to the ink-receptive layer coating solution 3 having the following composition. A coating amount of the solid content of the resin emulsion was 30 g/m$^2$.
<Ink-receptive Layer Coating Solution 3>
Cationic styrene-acryl resin emulsion (concentration of the solid content: 32%) 100 parts
(ACRIT UW520, available from TAISEI FINE CHEMICAL CO., LTD., an average particle size: 50 nm)
Diluted with water to have a concentration of the solid content of 30%.

<<Preparation of Recording Sheet 29>>
In Recording sheet 1, the ink-receptive layer coating solution 1 was changed to the ink-receptive layer coating solution 4 having the following composition, coating was carried out by using a slide bead coating device, and drying was carried out by blowing a hot air at 50° C. and 60° C. successively. A coating amount of the ink-receptive layer coating solution was 30 g/m$^2$ in terms of alumina solid content. Furthermore, Front surface layer coating solution 1 was coated and dried in the same manner as in Recording sheet 1 to prepare Recording sheet 29.
<Alumina Hydrate Dispersion 1>
To water were added nitric acid (2.5 parts) and alumina hydrate (average primary particle size: 15 nm), and the mixture was dispersed by using a saw blade type dispersing device to prepare an alumina hydrate dispersion having a concentration of the solid content of 30%. The average secondary particle size was 160 nm.

| <Ink-receptive layer coating solution 4> | |
|---|---|
| Alumina hydrate dispersion 1 | 100 parts (as a solid content of alumina hydrate) |
| Polyvinyl alcohol | 12 parts |
| (Saponification degree: 88%, average degree of polymerization: 3500) | |
| Boric acid | 0.5 part |
| Nonionic surfactant | 0.3 part |
| (Polyoxyethylene alkyl ether) | |

Adjusted with water to have a concentration of the solid content of 16.12%.

<<Preparation of Recording Sheet 30>>

Recording sheet 30 was prepared by not providing Front surface layer coating solution in the above-mentioned Recording sheet 29.

Examples 1 to 18 and Comparative Examples 1 to 12

With regard to the obtained respective Recording sheets, evaluations were carried out according to the following criteria and the results are shown in Table 1.

<Ink Drying Property>

Printing of solid colors of K, C, G, Y, R, M and B was carried out with regard to respective recording materials by using an ink-jet printer (SolJet PROII V manufactured by ROLAND DG CORPORATION) which employs glycol inks (ECO-SOLMAX ink-set manufactured by ROLAND DG CORPORATION), and after a certain period of time from the printing, paper was overlapped onto the each recording material. It was observed whether the ink is transferred or not to the paper. Evaluation was carried out with the following criteria.

○: Transfer did not occur within 5 minutes.

Δ: Transfer did not occur after 30 minutes past.

×: Transfer caused after 30 minutes past.

<Coloring Property>

Printing of solid colors of C, G, Y, R, M and B was carried out by using an ink-jet printer (SolJet PROII V manufactured by ROLAND DG CORPORATION). Respective data of a* and b* specified by JIS-Z8730 were plotted to the a*-b* coordinates, and the respective points were connected with straight lines to obtain an area surrounded by the lines, and the area was compared with each other. Broader surface area means better coloring property. Evaluation was carried out by the following criteria with Recording sheet 24 as ×.

○: It has clearly good coloring property than that of Recording sheet 24.

Δ: It has slightly good coloring property than that of Recording sheet 24.

×: It has substantially the same coloring property as that of Recording sheet 24.

<Scratch Resistance>

Printing of solid colors of K, C, G, Y, R, M and B was carried out by using an ink-jet printer (SolJet PROII V manufactured by ROLAND DG CORPORATION), and the solid color area was scratched with a finger immediately after the printing, 5 minutes later, 15 minutes later, and 60 minutes later, respectively, and it was observed with naked eyes whether the ink adhered to the fingertip or not. Evaluation was carried out with the following criteria.

TABLE 1

| | Recording Sheet | Ink | Ink drying property | Coloring property | Scratch resistance |
|---|---|---|---|---|---|
| Example 1 | 1 | Grycol ink | ○ | ○ | ◎ |
| Example 2 | 2 | " | ○ | ○ | ◎ |
| Example 3 | 3 | " | ○ | ○ | ◎ |
| Example 4 | 4 | " | ○ | ○ | ◎ |
| Example 5 | 5 | " | ○ | ○ | ◎ |
| Example 6 | 6 | " | ○ | ○ | ◎ |
| Example 7 | 7 | " | ○ | ○ | Δ |
| Example 8 | 8 | " | ○ | ○ | ○ |
| Example 9 | 9 | " | ○ | ○ | ○ |
| Example 10 | 10 | " | ○ | ○ | Δ |
| Comparative Example 1 | 11 | " | ○ | Δ | × |
| Comparative Example 2 | 12 | " | ○ | Δ | × |
| Comparative Example 3 | 13 | " | ○ | Δ | × |
| Comparative Example 4 | 14 | " | ○ | Δ | × |
| Comparative Example 5 | 15 | " | ○ | Δ | × |
| Comparative Example 6 | 16 | " | ○ | Δ | × |
| Comparative Example 7 | 17 | " | ○ | Δ | × |
| Comparative Example 8 | 18 | " | ○ | Δ | × |
| Example 11 | 19 | " | ○ | ○ | Δ |
| Example 12 | 20 | " | ○ | Δ | Δ |
| Example 13 | 21 | " | ○ | ○ | ○ |
| Example 14 | 22 | " | ○ | ○ | ◎ |
| Example 15 | 23 | " | ○ | ○ | ◎ |
| Example 16 | 24 | " | ○ | ○ | ○ |
| Example 17 | 25 | " | Δ | Δ | Δ |
| Comparative Example 9 | 26 | " | ○ | × | × |
| Comparative Example 10 | 27 | " | × | × | × |
| Comparative Example 11 | 28 | " | × | × | × |
| Example 18 | 29 | " | ○ | ○ | ◎ |
| Comparative Example 12 | 30 | " | ○ | × | × |

◎: Ink did not adhere to the fingertip with a lapse of 5 minutes.
○: Ink did not adhere to the fingertip with a lapse of 15 minutes.
Δ: Ink did not adhere to the fingertip with a lapse of 60 minutes.
×: Ink did not adhere to the fingertip even after a lapse of 60 minutes or more.

As can be clearly seen from the table 1, it can be understood that, the ink-jet recording method of Examples 1 to 18, in which printing was carried out with the glycol ink on Recording sheets 1 to 10, 19 to 25 and 29, give excellent coloring property, ink drying property and scratch resistance. In Comparative Examples 1 to 8 in which printing was carried out with the glycol ink on Recording sheets 11 to 18, excellent scratch resistance could not be obtained. In Comparative Example 10 in which printing was carried out on Recording sheet 27, a ratio of the resin emulsion is higher relative to the amount of the pigment and a porous structure with a high void ratio could not be realized, so that a long time is required for drying. In Comparative Example 11 in which printing was carried out on Recording sheet 28, ink could not be absorbed and overflown on the ink-receptive layer, and the printed area was cracked with the progress of drying.

Comparative Examples 13 to 16

With regard to the above-mentioned Recording sheets 1 and 26 to 28, printing was carried out in the same manner as in Example 1 except for changing the ink-jet printer used in Example 1 to an ink-jet printer (manufactured by MUTOH INDUSTRIES LTD., LAMILESS GRANDE) using a solvent ink comprising cyclohexanone (LAMILESS ink "Real-solvent ink" manufactured by MUTOH INDUSTRIES LTD.) as a main solvent. Evaluation was carried out in the same manner as in Example 1 and the results are shown in Table 2.

TABLE 2

|  | Recording Sheet | Ink | Ink drying property | Coloring property | Scratch resistance |
|---|---|---|---|---|---|
| Comparative Example 13 | 1 | Solvent ink | ○ | X | ○ |
| Comparative Example 14 | 26 | " | ○ | X | ○ |
| Comparative Example 15 | 27 | " | ○ | X | ○ |
| Comparative Example 16 | 28 | " | Δ | X | ○ |

As can bee seen from the table 2, when printing was carried out with the solvent ink, Recording sheet 1 and Recording sheets 26 to 28 did not cause any difference in effects of ink drying property, coloring property and scratch resistance.

Comparative Examples 17 to 20

With regard to the above-mentioned Recording sheets 1 and 26 to 28, printing was carried out in the same manner as in Example 1 except for changing the ink-jet printer used in Example 1 with an ink-jet printer (IJP-3600 manufactured by OLYMPUS CORPORATION) using an oily pigment ink (genuine ink manufactured by OLYMPUS CORPORATION). Evaluation was carried out in the same manner as in Example 1 and the results are shown in Table 3.

TABLE 3

|  | Recording Sheet | Ink | Ink drying property | Coloring property | Scratch resistance |
|---|---|---|---|---|---|
| Comparative Example 17 | 1 | Oily pigment ink | Δ | X | ○ |
| Comparative Example 18 | 26 | " | Δ | X | ○ |
| Comparative Example 19 | 27 | " | Δ | X | ○ |
| Comparative Example 20 | 28 | " | X | X | ○ |

As seen from the table 3, when printing was carried out with the oily pigment ink, Recording sheet 1 and Recording sheets 26 to 28 did not cause any difference in effects of ink drying property, coloring property, and scratch resistance.

From the above results, it can be understood that the recording method for printing with the glycol ink according to the present invention gives excellent coloring property, ink drying property, and scratch resistance.

The invention claimed is:

1. An ink-jet recording method for printing with a glycol ink which contains 60 parts by weight or more of glycol ether based on 100 parts by weight of the ink, said method comprising printing by
    ejecting the glycol ink on an ink jet recording material which comprises
        a support,
        at least one porous ink-receptive layer which contains inorganic fine particles having an average secondary particle size of 500 nm or less and a resin binder which is provided on the support, and
        an uppermost, front surface layer containing an acrylic resin emulsion which is provided on the ink-receptive layer, wherein a ratio of the acrylic resin emulsion in the uppermost, front surface layer is 60% by weight or more based on the whole solid content of the uppermost, front surface layer.

2. The ink-jet recording method according to claim 1, wherein an average particle size of the acrylic resin emulsion in the uppermost layer is 22 nm or more and 250 nm or less.

3. The ink-jet recording method according to claim 1, wherein an average particle size of the acrylic resin emulsion in the uppermost layer is 50 nm or more and 100 nm or less.

4. The ink-jet recording method according to claim 1, wherein a coated amount of the acrylic resin emulsion in the uppermost layer in a solid content is 50 mg/m² or more and 200 mg/m² or less.

5. The ink-jet recording method according to claim 1, wherein the acrylic resin emulsion in the uppermost layer is a resin emulsion containing at least one of acrylic acid, methacrylic acid and an ester thereof as a polymerization component(s) in an amount of 50 parts by weight or more based on 100 parts by weight of a solid content of the resin emulsion.

6. The ink-jet recording method according to claim 1, wherein a contained amount of the resin binder is 5 to 40% by weight based on an amount of the inorganic fine particles having an average secondary particle size of 500 nm or less.

7. The ink-jet recording method according to claim 1, wherein the glycol ink is a glycol-type pigment ink.

8. The ink-jet recording method according to claim 1, wherein the glycol ether in the glycol ink is at least one selected from the group consisting of polyoxyethylene glycol dialkyl ether, polyoxyethylene glycol monoalkyl ether and polypropylene glycol monoalkyl ether.

9. The ink-jet recording method according to claim 1, wherein the support is a polyolefin resin-coated paper.

10. The ink-jet recording method according to claim 1, wherein a ratio of the acrylic resin emulsion in the uppermost, front surface layer is 80% by weight or more based on the whole solid content of the uppermost, front surface layer.

* * * * *